(12) United States Patent
Iwamoto et al.

(10) Patent No.: US 8,118,953 B2
(45) Date of Patent: Feb. 21, 2012

(54) METHOD FOR PRODUCING STEEL PART HAVING LONG ROLLING CONTACT FATIGUE LIFE

(75) Inventors: Takashi Iwamoto, Tokyo (JP); Kunikazu Tomita, Tokyo (JP); Hideto Kimura, Tokyo (JP); Takaaki Toyooka, Tokyo (JP); Hisato Nishisaka, Osaka (JP); Masao Goto, Osaka (JP); Hisashi Harada, Osaka (JP)

(73) Assignees: JFE Steel Corporation (JP); JTEKT Corporation (JP)

( * ) Notice: Subject to any disclaimer, the term of this patent is extended or adjusted under 35 U.S.C. 154(b) by 58 days.

(21) Appl. No.: 12/694,674

(22) Filed: Jan. 27, 2010

(65) Prior Publication Data

US 2010/0139819 A1 Jun. 10, 2010

Related U.S. Application Data

(62) Division of application No. 11/706,687, filed on Feb. 15, 2007, now abandoned.

(30) Foreign Application Priority Data

Feb. 28, 2006 (JP) .................................. 2006-052688

(51) Int. Cl.
*C21D 8/00* (2006.01)
*C21D 9/36* (2006.01)
*C21D 9/40* (2006.01)

(52) U.S. Cl. ......... 148/659; 148/653; 148/654; 148/906
(58) Field of Classification Search .......... 148/333–335, 148/654, 659, 906, 653
See application file for complete search history.

(56) References Cited

U.S. PATENT DOCUMENTS 6,383,317 B1 5/2002 Bellus et al.
6,602,360 B2 8/2003 Takemura et al.
(Continued)

FOREIGN PATENT DOCUMENTS

JP 1-306542 A 12/1989
(Continued)

OTHER PUBLICATIONS

G.Krauss, Microstructures, Processing, and Properties of Steels, Properties and selection: Irons, Steels, and High-Performance Allys, vol. 1, ASM Handbook, ASM International, 1990, p. 1.*

(Continued)

*Primary Examiner* — Deborah Yee
(74) *Attorney, Agent, or Firm* — DLA Piper LLP (US)

(57) ABSTRACT

A steel part having a long rolling contact fatigue life and capable of further increasing the life of a bearing under severer using condition than usual conditions. The steel part includes steel having a composition containing 0.7% by mass to 1.1% by mass of C, 0.5% by mass to 2.0% by mass of Si, 0.4% by mass to 2.5% by mass of Mn, 1.6% by mass to 5.0% by mass of Cr, 0.1% by mass to less than 0.5% by mass of Mo, 0.010% by mass to 0.050% by mass of Al, less than 0.0015% by mass of Sb as an impurity, and the balance composed of Fe and inevitable impurities, the steel being hardened and tempered. In the steel structure of a portion from the surface to a depth of 5 mm, residual cementite has a grain diameter of 0.05 to 1.5 μm, prior austenite has a grain diameter of 30 μm or less, and the ratio by volume of the residual austenite is less than 25%.

6 Claims, 2 Drawing Sheets

U.S. PATENT DOCUMENTS

2006/0081314 A1    4/2006   Iwamoto et al.

FOREIGN PATENT DOCUMENTS

| JP | 3-126839 A | 5/1991 |
| JP | 6-287691 A | 10/1994 |
| JP | 6-293939 A | 10/1994 |
| JP | 11-080896 A | 3/1999 |
| JP | 2004-315890 A | 11/2004 |

OTHER PUBLICATIONS

B. L. Bramfitt, Annealing of Steel, Heat Treating, vol. 4, ASM Handbook, ASM International, 1991, pp. 1-5.*

* cited by examiner

METHOD FOR PRODUCING STEEL PART HAVING LONG ROLLING CONTACT FATIGUE LIFE

RELATED APPLICATIONS

This application is a divisional of U.S. application Ser. No. 11/706,687, filed Feb. 15, 2007, now abandoned, which claims priority of Japanese Patent Application No. 2006-052688, filed Feb. 28, 2006, herein incorporated by reference.

TECHNICAL FIELD

The technology in this disclosure relates to steel parts which have a long rolling contact fatigue life and which are used as components of rolling bearings such as roller bearings and ball bearings, and toroidal continuously variable transmissions. In particular, it relates to steel parts which have a long life until peculiar damage has occurred in a severe environment of bearing using, i.e., until microstructural change (damage) has occurred below a rolling contact plane due to cyclic load, and a method for producing the steel parts.

BACKGROUND

As materials for steel parts constituting rolling bearings used for automobiles and industrial machines, high-carbon chromium bearing steel defined in JIS-SUJ2 is most frequently used. In general, an important property of bearing steel is a long rolling contact fatigue life, and a possible main factor which influences the rolling contact fatigue life is a non-metallic inclusion in steel. Therefore, as a commonly employed countermeasure, the oxygen content in the high-carbon chromium steel is decreased to control the amount, shape, and size of a non-metallic inclusion, thereby improving a bearing life (refer to, for example, Japanese Unexamined Patent Application Publication No. 1-306542 and Japanese Unexamined Patent Application Publication No. 3-126839).

However, to produce bearing steel containing a small amount of non-metallic inclusion, it is necessary to install expensive refining equipment or significantly improve conventional equipment. Therefore, there is the problem of a high economic load.

Accordingly, research was conducted to resolve the problem. As a result, it was found that even when the amount of a non-metallic conclusion is simply decreased, in many cases, a large effect cannot be obtained on improvement in the rolling life of a bearing, particularly the bearing life under a severe condition such as a high load or a high temperature. This led to the finding that as a factor which determines the rolling life, there is a factor other than the presence of a "non-metallic inclusion" which has been conventionally discussed. Specifically, a microstructural change layer composed of a white etched constituent occurs in a lower layer (surface layer) of a contact plane due to shear stress in contact between inner and outer rings and a rolling element of a bearing as the environment of bearing using becomes severe. In addition, the microstructural change layer is gradually grown as the number of cycles increases, and finally spalling occurs by rolling contact fatigue in the microstructural change portion to determine the bearing life. It was also found that the severe environment of bearing using, i.e., a higher plane pressure (reduction in size) and an elevated using temperature, decrease the number of cycles until a microstructural change has occurred, resulting in a significant decrease in the bearing life. Such a decrease in the bearing life in the severe environment of using cannot be sufficiently suppressed only by controlling the amount of a non-metallic inclusion as in related art. Therefore, it is thought to be necessary to retard the microstructural change.

As a countermeasure, bearing steel containing 0.5 to 1.5% by mass of C, over 2.5 to 8.0% by mass of Cr, 0.001 to 0.015% by mass of Sb, 0.002% by mass or less of O, and the balance composed of Fe and inevitable impurities has been proposed, and bearing steel containing these elements and further containing over 0.5 to 2.5% by mass of Si, 0.05 to 2.0% by mass of Mn, 0.05 to 0.5% by mass of Mo, and 0.005 to 0.07% by mass of Al has been developed (refer to Japanese Unexamined Patent Application Publication No. 6-287691).

As a result, the microstructural change due to cyclic load in rolling contact under high load was retarded, and so-called "$B_{50}$ high-load rolling contact fatigue life (total number of cycles until a white portion of a microstructural change layer spalls at a cumulative failure probability of 50% in a rolling contact fatigue test)" was improved.

However, the environment of bearing using has been recently made severer than that at the time of filing of Japanese Unexamined Patent Application Publication No. 6-287691, and thus the development of steel having a long rolling contact fatigue life has been desired ardently.

Therefore, a steel was developed having a long rolling contact fatigue life as steel capable of further increasing a bearing life even under severe using conditions, the steel having a composition containing 0.7 to 1.1% by mass of C, 0.5 to 2.0% by mass of Si, 0.4 to 2.5% by mass of Mn, 1.6 to 4.0% by mass of Cr, 0.1 to less than 0.5% by mass of Mo, 0.010 to 0.050% by mass of Al, and the balance composed of Fe and inevitable impurities, being subjected to hardening and tempering, and having a microstructure including residual cementite with a grain diameter of 0.05 to 1.5 μm and prior austenite with a grain diameter of 30 μm or less (refer to Japanese Unexamined Patent Application Publication No. 2004-315890).

With that steel, the average grain diameter of residual cementite is properly controlled to retard the microstructural change and increase the n number of cycles until the microstructure spalls. Furthermore, the grain diameter of prior austenite in the microstructure after hardening and tempering is refined to suppress the development of fatigue cracking and further improve the rolling contact fatigue life.

However, when the steel is applied to a component of an actual bearing, a sufficient rolling contact fatigue life may not be exhibited, thereby causing the need for further improvement.

SUMMARY

We provide steel parts which have a long rolling contact fatigue life and which are capable of further increasing the life of a bearing under severer using conditions than usual conditions, and provide a useful method for producing the steel parts.

We provide in particular:
(1) A steel part having a long rolling contact fatigue life, comprising steel having a composition containing:
C: 0.7% by mass to 1.1% by mass;
Si: 0.5% by mass to 2.0% by mass;
Mn: 0.4% by mass to 2.5% by mass;
Cr: 1.6% by mass to 5.0% by mass;
Mo: 0.1% by mass to less than 0.5% by mass;
Al: 0.010% by mass to 0.050% by mass;
less than 0.0015% by mass of Sb as an impurity, and the balance composed of Fe and inevitable impurities, the steel being hardened and tempered, wherein a portion from the surface to a depth of 5 mm has a steel structure in which residual cementite has a grain diameter of 0.05 to 1.5 μm, prior austenite has a grain diameter of 30 μm or less, and the ratio by volume of the residual austenite is less than 25%.

(2) The steel part having a long rolling contact fatigue life described above in (1), the steel further containing at least one selected from the following:
Ni: 0.5% by mass to 2.0% by mass;
V: 0.05% by mass to 1.00% by mass; and
Nb: 0.005% by mass to 0.50% by mass.

(3) A method for producing a steel part having a long rolling contact fatigue life, the method including hot-working steel, spheroidizing annealing the steel by maintaining at 800° C. to 850° C. for 5 hours or more and cooling to 700° C. or less at a rate of 0.01° C./s or less, and hardening and tempering the steel, the steel having a composition containing:
C: 0.7% by mass to 1.1% by mass;
Si: 0.5% by mass to 2.0% by mass;
Mn: 0.4% by mass to 2.5% by mass;
Cr: 1.6% by mass to 5.0% by mass;
Mo: 0.1% by mass to less than 0.5% by mass;
Al: 0.010% by mass to 0.050% by mass;
less than 0.0015% by mass of Sb as an impurity, and the balance composed of Fe and inevitable impurities.

(4) A method for producing a steel part having a long rolling contact fatigue life, the method including hot-working steel, cooling the steel to 200° C. at a cooling rate of 0.5° C./s or less, spheroidizing annealing the steel by maintaining at 750° C. to 850° C. and cooling to 700° C. or less at a rate of 0.015° C./s or less, and hardening and tempering the steel, the steel having a composition containing:
C: 0.7% by mass to 1.1% by mass;
Si: 0.5% by mass to 2.0% by mass;
Mn: 0.4% by mass to 2.5% by mass;
Cr: 1.6% by mass to 5.0% by mass;
Mo: 0.1% by mass to less than 0.5% by mass;
Al: 0.010% by mass to 0.050% by mass;
less than 0.0015% by mass of Sb as an impurity, and the balance composed of Fe and inevitable impurities.

(5) The method for producing the steel part having a long rolling contact fatigue life described above in (3) or (4), the steel further containing at least one selected from the following:
Ni: 0.5% by mass to 2.0% by mass;
V: 0.05% by mass to 1.00% by mass; and
Nb: 0.005% by mass to 0.50% by mass.

According to our steel parts and methods, a microstructural change in a rolling environment under a high load is retarded, and thus a steel part having a high-load rolling contact fatigue life represented by so-called $B_{50}$ can be provided. Therefore, a steel part required to have the resistance to rolling contact fatigue as a constituent part of, for example, a roller bearing, can be reduced in size, and a steel part usable in an environment at a higher speed and higher load can be provided.

Figure 1:
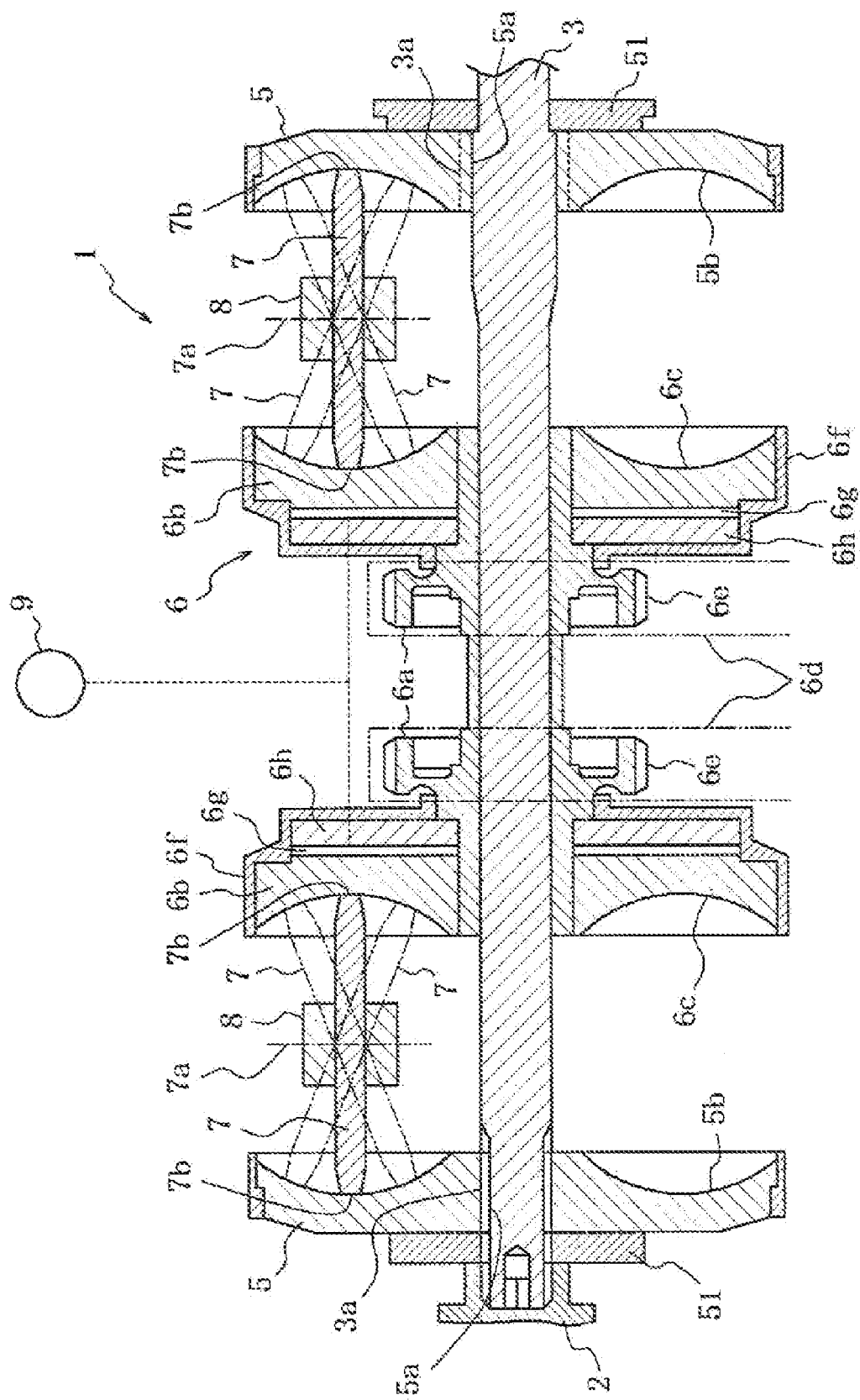
FIG. 1 is a partial sectional view showing a toroidal continuously variable transmission.

| | |
|---|---|
| 5 | input disk |
| 5b | orbital plane |
| 6b | output disk |
| 6c | orbital plane |
| 7 | roller |
| 7b | peripheral surface |
| 10 | durability life test rig |
| 11 | disk |
| 13 | first roller |
| 14 | second roller |
| 15 | drive unit |

DETAILED DESCRIPTION

We researched damage to a microstructure of steel used for a bearing under a severe rolling environment. As a result, it was found that the damage is mainly caused by stress concentration in a hard portion of steel and diffusion of carbon (symbol: C) in the periphery thereof. In other words, a microstructural change in the steel can be retarded by suppressing C diffusion in the steel under a using environment.

Therefore, a method for realizing the finding was further researched. As a result, it was found that as a method for suppressing C diffusion in steel, the austenite grains (represented by γ hereinafter) present in the metallic structure of the steel are refined in a heating process for hardening, and the grain diameter of retained cementite after hardening and tempering is controlled to 0.05 to 1.5 μm.

In high-carbon bearing steel represented by JIS-SUJ2, coarse carbide with a grain diameter of 5 μm or more, which is referred to as "eutectic carbide", may remain in steel after hardening and tempering due to the influence of coarse carbide crystallized when melted steel is cast and solidified. Such coarse carbide is removed of course, and the spheroidal carbide produced in spheroidizing annealing functions as a stress concentrator with coarsening of the spheroidal carbide to promote a microstructural change. As a measure against this, the steel disclosed in Japanese Unexamined Patent Application Publication No. 2004-315890 was developed.

In other words, in the technique disclosed in Japanese Unexamined Patent Application Publication No. 2004-315890, to retard a microstructural change, the average grain diameter of residual cementite is controlled in a proper range, specifically 0.05 to 1.5 μm, in which stress concentration in a boundary between the residual cementite and a matrix can be suppressed while promoting dissolution of C into the matrix. In addition, as a method for controlling the average grain diameter of residual cementite in the proper range, a method of spheroidizing annealing by maintaining at 750° C. to 850° C. and then cooling to 700° C. or less at a rate of 0.015° C./s or less is used.

Furthermore, in an attempt to apply the steel to an actual part, we worked the steel into the part shape by hot-working such as hot-casting or the like and then spheroidized and annealed the part under the conditions descried above to produce a desired microstructure. In this attempt, the average grain diameter of residual cementite in a surface layer was not necessarily controlled in the range of 0.05 to 1.5 μm, thereby causing the problem of failing to obtain an expected rolling contact fatigue characteristic. Furthermore, when finishing was performed by cutting after spheroidizing annealing (before hardening and tempering), the problem of very low machinability due to the hard surface layer occurred.

As a result of intensive research on the causes of the problems, it was found that when large amounts of Cr and Mo are contained, the microstructure of the surface layer after hot-working becomes a structure containing bainite or martensite, not containing cementite, and thus the growth of cementite does not sufficiently proceed even by subsequent spheroidizing annealing. Since the growth of cementite is insufficient after spheroidizing annealing, dissolution of C in an austenite phase as a mother phase excessively proceeds during heating for hardening, and thus the amount of residual austenite after hardening and tempering is excessively increased, thereby causing an adverse effect on the rolling contact fatigue life. It was further found that since the microstructure of the surface layer becomes a structure containing bainite or martensite after hot-working, softening does not sufficiently proceed after spheroidizing annealing, thereby causing difficulty in cutting.

As a result of further research, it was found that when hot-working conditions or spheroidizing annealing conditions are optimized, the microstructure of the surface layer of the steel part can be optimized, and the steel part having a long rolling contact fatigue life while maintaining machinability after spheroidizing annealing can be obtained after hardening and tempering.

Examples of the part include orbital parts such as an inner ring and an outer ring, and a rolling element, which constitute a rolling bearing, and a disk and a roller which constitute a toroidal continuously variable transmission. FIG. 1 shows the structure of a toroidal continuously variable transmission as an example.

FIG. 1 is a schematic drawing showing a variator 1 of a full toroidal continuously variable transmission which is a type of toroidal continuously variable transmission. The variator 1 includes an input shaft 3 rotated by an output shaft 2 of an engine, input disks 5 being supported near both ends of the input shaft 3.

In each of the input disks 5, a concavely curved orbital plane 5b is formed in one of the sides, and a plurality of spline holes 5a is formed in the inner periphery. The spline holes 5a are engaged to a splined shaft 3a provided on the input shaft 3 to integrally rotatably attach each of the input disks 5 to the input shaft 3. In addition, the opposite movements of the input disks 5 are restricted by anchor rings 51 fixed to the input shaft 3.

Further, output units 6 each including an output part 6a and an output disk 6b integrally rotatably supported by the output part 6a are relatively rotatably provided at the center of the input shaft 3 in the axial direction thereof. In addition, a concavely curved orbital plane 6c is formed on one of the sides of each output disk 6b which faces the orbital plane 5b of each input disk 5. Further, sprocket gears 6e are formed in the outer periphery of each output part 6a so as to engage with a chain 6d so that power is transmitted to the outside through the chain 6d.

Each of the output disks 6b is attached to allow slight movement in the axial direction of the output part 6a, and a backup plate 6h is disposed at the back of each output disk 6b with a gap 6g therebetween. The gap 6g is sealed with a casing 6f and a seal (not shown in the drawing). When hydraulic pressure is supplied to the gap 6g from a hydraulic power source, the output disk 6b is urged toward the opposing input disk 5 to apply a predetermined terminal load.

In addition, a toroidal gap is formed between the orbital plane 5b of each input disk 5 and the orbital plane 6c of each output disk 6b, which are opposed to each other. A lubricant (traction oil) is supplied to the toroidal gap, and three disk rollers 7 are disposed at peripheral positions at equal intervals so as to rotate in contact with the orbital planes 5b and 6c through an oil film. The portions of contact between the orbital planes 5b and 6c are the peripheral surfaces 7bb of the rollers 7. Each of the rollers 7 is rotatably supported by a carriage 8 so that the rotational shaft 7a thereof can be tilted. In addition, driving forces is applied to the carriages 8 by hydraulic pressure in the direction crossing the drawing of FIG. 1.

In the variator 1, when the pair of input disks 5 is rotated, torque is transmitted from the input disks 5 to the output disks 6b by shearing force of the oil film through the three rollers 7 on each of the right and left sides. The rollers 7 supported by the carriages 8 incline the rotational shafts 7a to remove unbalance between the reaction force generated in the carriages 8 due to torque transmission and the torque necessary for driving the output disks 6b. Consequently, the positions of the rollers 7 are changed as shown by two-dot chain lines in FIG. 1 to continuously change the change gear ratio between the disks 5 and 6b.

In such a toroidal continuously variable transmission, the portions of rolling contact between the input/output disks and the rollers are subjected to a high temperature (100° C. or more) and high surface pressure (maximum contact surface pressure 4 to 4.5 GPa or more). In addition, for example, when three rollers are disposed, large vertical stress is repeatedly applied to the orbital planes of the input/output disks from the three points, and high shearing stress is repeatedly applied due to the traction during power transmission. Therefore, the orbital planes of the input/output disks are under specific severe contact conditions as compared with a rolling surface of a usual rolling bearing in which only vertical stress is mainly applied to the surface. Therefore, the orbital plane of each disk is required to have high fatigue strength to prevent the occurrence of spalling starting at the surface due to metal contact and spalling due to a structural change even when used under such specific severe contact conditions.

Next, the reasons for providing the ranges of the components of the steel part will be described below.

C: about 0.7% by mass to about 1.1% by mass

In a metal structure of steel, C is dissolved in a matrix. However, to strengthen martensite grains to cause an effective function to secure hardness of steel after hardening and tempering and improve the rolling contact fatigue life, a C content of about 0.7% by mass or more is required. However, at an excessively high C content, the formation of coarse carbide such as eutectic carbide is accelerated, and a microstructural change due to C diffusion in steel is promoted, thereby degrading the rolling contact fatigue life. Therefore, the upper limit is about 1.1% by mass.

Si: about 0.5% by mass to about 2.0% by mass

Si functions as a deoxidizer in refining of steel and is solid-dissolved in a matrix to suppress a decrease in strength of steel in tempering after hardening. Further, Si is an effective element for retarding a microstructural change in an environment under rolling load. To sufficiently exhibit these effects, a Si content of about 0.5% by mass or more is required. On the other hand, a content over about 2.0% by mass causes significant deterioration in the castability and machinability of steel. Therefore, the upper limit is about 2.0% by mass.

Mn: about 0.4% by mass to about 2.5% by mass

Mn functions as a deoxidizer in refining of steel and is an effective element for decreasing the oxygen content of steel. In addition, Mn effectively functions to improve the hardenability of steel to improve toughness and strength of martensite constituting a matrix, and improve the rolling contact fatigue life. Furthermore, Mn has the effect of stabilizing a cementite phase and retard a microstructural change. To sufficiently exhibit these effects, a Mn content of about 0.4% by mass or more is required. On the other hand, a content over about 2.5% by mass causes significant deterioration in the castability and machinability of steel. Therefore, the upper limit is about 2.5% by mass.

Cr: about 1.6% by mass to about 5.0% by mass

Cr has the function to stabilize a cementite phase in steel to suppress C diffusion and the function to suppress coarsening of cementite grains to prevent stress concentration. Also, Cr is an element effectively functioning to improve the rolling contact fatigue life. To achieve the sufficient effect, a Cr content of about 1.6% by mass or more is required. On the other hand, at a content of over about 5% by mass, the amount of C dissolved in martensite is decreased to decrease hardness after hardening and tempering, thereby degrading the rolling contact fatigue life. Therefore, the upper limit is about 5% by mass.

Mo: about 0.1% by mass to less than about 0.5% by mass

Mo is solid-dissolved in a matrix and has the function to suppress a decrease in strength of steel during tempering after hardening. Further, Mo improves hardness of steel after hardening and tempering and improves the rolling contact fatigue life. In addition, Mo has the function to stabilize carbide to retard a microstructural change. However, at a content of less than about 0.1% by mass, the effect cannot be sufficiently obtained, while at a content of about 0.5% by mass or more, the effect is saturated, thereby increasing the cost. Therefore, the content is about 0.1% by mass to less than about 0.5% by mass.

Al: about 0.010% by mass to about 0.050% by mass

Al is necessary as a deoxidizer in refining of steel and is positively added as an element functioning to refine prior austenite grains by bonding to N in steel to effectively improve the rolling contact fatigue life. To obtain the sufficient effect, a content of about 0.010% by mass or more is required. On the other hand, at a high content over about 0.050% by mass, the rolling contact fatigue life is degraded by AlN precipitated in a large amount in steel. Therefore, the content is about 0.010% by mass to about 0.050% by mass.

Sb: less than about 0.0015% by mass

Sb is an element possibly mixed from an iron source such as scraps, but segregates at austenite grain boundaries in hot-working to degrade hot-workability, toughness, and the rolling contact fatigue life of steel due to mixing of Sb. Therefore, it is necessary to control the amount of Sb mixing to a low value by appropriately selecting an iron source. The above problem generally becomes significant when about 0.0010% by mass or more Sb is mixed. However, when the grain diameter of prior austenite is achieved, the allowable upper limit of the amount of Sb mixing can be increased by increasing the grain boundary area. However, the amount of Sb mixing in steel must be controlled to less than about 0.0015% by mass.

In addition to the above-described basic components, at least one selected from about 0.5% by mass to about 2.0% by mass of Ni, about 0.05% by mass to about 1.00% by mass of V, and about 0.005% by mass to about 0.50% by mass of Nb can be further contained.

Ni: about 0.5% by mass to about 2.0% by mass

Since Ni is solid-dissolved in a matrix to suppress a decrease in strength of steel after tempering, Ni is added according to demand. To obtain the sufficient effect, a content of about 0.5% by mass is required. On the other hand, a content of over about 2.0% by mass causes the formation of a large amount of residual austenite, thereby decreasing the strength after hardening and tempering. Therefore, the upper limit of the content is about 2.0% by mass.

V: about 0.05% by mass to about 1.00% by mass

V has the function to form stable carbide and improve hardness of steel and the function to suppress a microstructural change to improve the rolling contact fatigue life. Therefore, V is added according to demand. In this case, at a content of less than about 0.05% by mass, the sufficient effect is not obtained, while at an excessively high content, the amount of dissolved C is decreased to decrease hardness of steel after hardening and tempering. Therefore, the upper limit of the content is about 1.00% by mass.

Nb: about 0.005% by mass to about 0.50% by mass

Like V, Nb has the function to form stable carbide and improve hardness of steel and the function to suppress a microstructural change to improve the rolling contact fatigue life. Therefore, Nb is added according to demand. In this case, at a content of less than about 0.005% by mass, the sufficient effect cannot be obtained, while at a content over about 0.05% by mass, the effect is saturated. Therefore, the content is about 0.005% by mass to about 0.50% by mass.

Next, the microstructure of the steel part will be described below.

It was found that in a steel part required to have a rolling contact fatigue life, the microstructure of a surface layer from the surface to a depth of about 5 mm is particularly important. Therefore, the steel part after hardening and tempering is required to have a portion from the surface to a depth of about 5 mm which satisfies the microstructure described below.

First, in the steel part after hardening and tempering, the cementite grain diameter in the steel structure of a portion from the surface to a depth of about 5 mm is controlled to about 0.05 μm to about 1.5 μm for the following reasons:

When the steel having the above-described C content is hardened and tempered, cementite present before hardening remains in the microstructure of the steel. Therefore, we repeatedly studied with attention to the fact that a distribution form of the residual cementite strongly influences the properties of a microstructural change. As a result, it was found that when the average grain diameter of residual cementite is smaller than about 0.05 μm, the ratio of the surface area of cementite to the volume is increased to promote dissolution of C into the matrix. On the other hand, when coarse residual cementite having an average grain diameter over about 1.5 μm is present, stress concentration in the boundaries between the residual cementite and the matrix is accelerated, and thus the number of cycles of stress application until the occurrence of a microstructural change and spalling of the microstructure is decreased. From this viewpoint, it was found that the grain diameter of residual cementite after hardening and tempering is preferably specified to about 0.05 μm to about 1.5 μm.

In the steel structure of a portion from the surface to a depth of about 5 mm, the grain diameter of prior austenite is specified to about 30 μm or less. The reason for this is that in the microstructure of the steel after hardening and tempering, when the grain diameter of prior austenite is about 30 μn or less, propagation of fatigue cracks within a crystal grain can be stopped at the grain boundary, and further progress can be retarded.

Furthermore, in the steel structure of a portion from the surface to a depth of about 5 mm, the ratio by volume of the residual austenite is specified to less than about 25%. In other words, a residual austenite phase at a residual austenite ratio of about 25% or more is transformed to martensite accompanying volume expansion in the using environment, thereby changing the dimensions of the steel part. The dimensional change causes a stress concentration portion to adversely affect the rolling contact fatigue.

The steel part having a long rolling contact fatigue life is produced through the following steps:

First, molten steel having the above-described chemical composition is refined in a steel making process and then continuously cast to form a cast slab. The steel cast slab is formed into a steel material (for example, a steel bar) by a hot-rolling process. The steel material is then formed in a steel part such as a bearing race by hot-working such as hot casting or the like. After spheroidizing annealing, if required, the steel part is cut and hardened and tempered to produce a steel part.

In the method for producing the steel part, it is necessary to use the following conditions (I) or (II):

(I) After the hot working, the steel is spheroidized and annealed by maintaining at about 800° C. to about 850° C. for about 5 hours or more and then cooling at a rate of about 0.01° C./s or less, and then hardened and tempered.

(II) After hot working at abut 900° C. or more, the steel is cooled to about 200° C. at a cooling rate of about 0.5° C./s or less, spheroidized and annealed by maintaining at about 750° C. to about 850° C. and then cooling to about 700° C. at a cooling rate of about 0.015° C./s or less, and then hardened and tempered.

In the method (I), the spheroidizing annealing conditions are controlled to control the average grain diameter of cementite in the surface layer of the steel part. When the usual hot-working conditions and subsequent cooling conditions are not particularly limited, in the steel composition, the structure of the surface layer may become a bainite or martensite structure after hot-working and cooling. Therefore, it is necessary to produce cementite for achieving the above-described final structure by subsequent spheroidizing annealing of the steel having a bainite or martensite structure. As a condition for this purpose, a spheroidizing annealing condition is required, in which the steel is maintained at about 800° C. to about 850° C. for about 5 hours or more and then cooled to about 700° C. or less at a cooling rate of about 0.01° C./s or less.

Namely, when the retention temperature is lower than about 800° C. or the retention time is less than about 5 hours, the sufficient growth of cementite in the surface layer cannot be expected, and the cementite grain diameter in the final surface layer structure cannot be controlled in the above-described range. Also, solid-dissolution of C in the austenite phase, which is a matrix in hardening heating, excessively proceeds, and thus the amount of the residual austenite in the final surface layer structure is excessively increased. On the other hand, when the retention temperature exceeds about 850° C., cementite after spheroidizing is coarsened, and, consequently, the residual cementite after hardening and tempering is also coarsened. In cooling after the retention, when the cooling rate to about 700° C. exceeds about 0.01° C./s, cementite precipitation during cooling proceeds in the form of reproduction of pearlite, not the growth of spheroidized cementite. Therefore, softening after spheroidizing annealing does not sufficiently proceed to degrade workability. Further, solid dissolution in hardening heating is excessively accelerated to form a large amount of residual austenite after hardening.

After the above-described spheroidizing annealing, hardening and tempering is performed. To obtain a desired residual cementite distribution and prior austenite grain diameter after hardening and tempering, the heating temperature of hardening is preferably about 800° C. to about 950° C. This is because the most desirable microstructure is produced in this temperature range. Although the fraction of the cementite structure after hardening and tempering changes mainly depending on the C content, the volume ratio is about 3 to about 25% in the composition range of this disclosure. In addition, a cutting work may be performed before the hardening and tempering. The above-mentioned spheroidizing annealing conditions have the effect of improving machinability because the surface layer is sufficiently softened.

Next, the method (II) will be described.

In the method (II), the hot-working conditions and subsequent cooling conditions are regulated to control the surface layer structure after the hot-working and cooling. When the hot-working temperature is lower than about 900° C., the mold life is decreased due to the high deformation resistance of steel, and cracks occur in casting due to the low deformation ability. Therefore, the hot-working is performed at about 900° C. or more. Further, in subsequent cooling, the condition is controlled so that the above-described final structure can be obtained in the surface layer.

When the cooling rate exceeds about 0.5° C./s, the sufficient growth of cementite in the surface layer cannot be expected by subsequent spheroidizing annealing, and the cementite grain diameter in the final surface layer structure cannot be controlled in the above-described range. Also, solid-dissolution of C in the austenite phase, which is a mother phase in hardening heating, excessively proceeds, and thus the amount of the residual austenite in the final surface layer structure is excessively increased.

Then, spheroidizing annealing is performed by retention at about 750° C. to about 850° C. and then cooling to about 700° C. at a cooling rate of about 0.015° C./s or less. When the retention temperature exceeds about 850° C., care must be taken because cementite after spheroidizing is coarsened and, consequently, the residual cementite after hardening and tempering is also coarsened. At the same time, layered cementite is newly formed in cooing after the retention, thereby causing difficult in obtaining desired spheroidal cementite.

On the other hand, when the retention temperature is lower than about 750° C., decomposition of cementite present as pearlite before spheroidizing annealing does not sufficiently proceed, and thus a desired residual cementite distribution cannot be obtained.

In cooling after the retention, the cooling rate to about 700° C. or less must be about 0.015° C./s or less. When the cooling rate exceeds about 0.015° C./s, cementite precipitation during cooling proceeds in the form of reproduction of pearlite, not the growth of spheroidized cementite. Therefore, softening after spheroidizing annealing does not sufficiently proceed to degrade workability. Further, solid dissolution in hardening heating is excessively accelerated to form a large amount of residual austenite after hardening.

After the above-described spheroidizing annealing, hardening and tempering is performed. To obtain a desired residual cementite distribution and prior austenite grain diameter after hardening and tempering, the heating temperature of hardening is preferably about 800° C. to about 950° C. This is because the most desirable microstructure is produced in this temperature range. Although the fraction of the cementite structure after hardening and tempering changes mainly depending on the C content, the volume ratio is about 3 to about 25% in the composition range of this disclosure. In addition, a cutting work may be performed before the hardening and tempering. The above-mentioned spheroidizing annealing conditions have the effect of improving machinability because the surface layer is sufficiently softened.

EXAMPLES

Molten steel having each of the chemical compositions shown in Table 1 was refined by a converter and then continuously cast to form a case slab. The resulting cast slab was diffusion-annealed at 1200° C. for 30 hours and then rolled to a steel bar of 64 mm or 90 mm in diameter.

The steel bar of 64 mm in diameter and the steel bar of 90 mm in diameter were hot-cast into a disk-like roller shape and a disk shape, respectively, at least the temperature shown in Table 2 and then cooled at various cooling rates. These disk and roller were normalized and then spheroidized and annealed. The spheroidizing annealing was performed by cooling to 650° C. from various retention temperatures at various cooling rates shown in Table 2 and then standing to cool. Then, to remove a decarbonized layer, a cutting work was performed to form a test piece with a final shape.

Further, after hardening, the tempering temperature was changed from the heating temperature shown in Table 2 according to the steel used, and the hardness HRc after tempering was controlled to 60 to 62, followed by polishing and lapping finishing.

Next, the resulting test piece was cut in the height direction of a column, and a section was corroded with a picric acid alcohol solution and then corroded with a nitric acid alcohol solution. Then, the microstructure was observed to measure the average grain diameter of residual cementite and the average grain diameter of prior austenite by image analysis.

Figure 2:
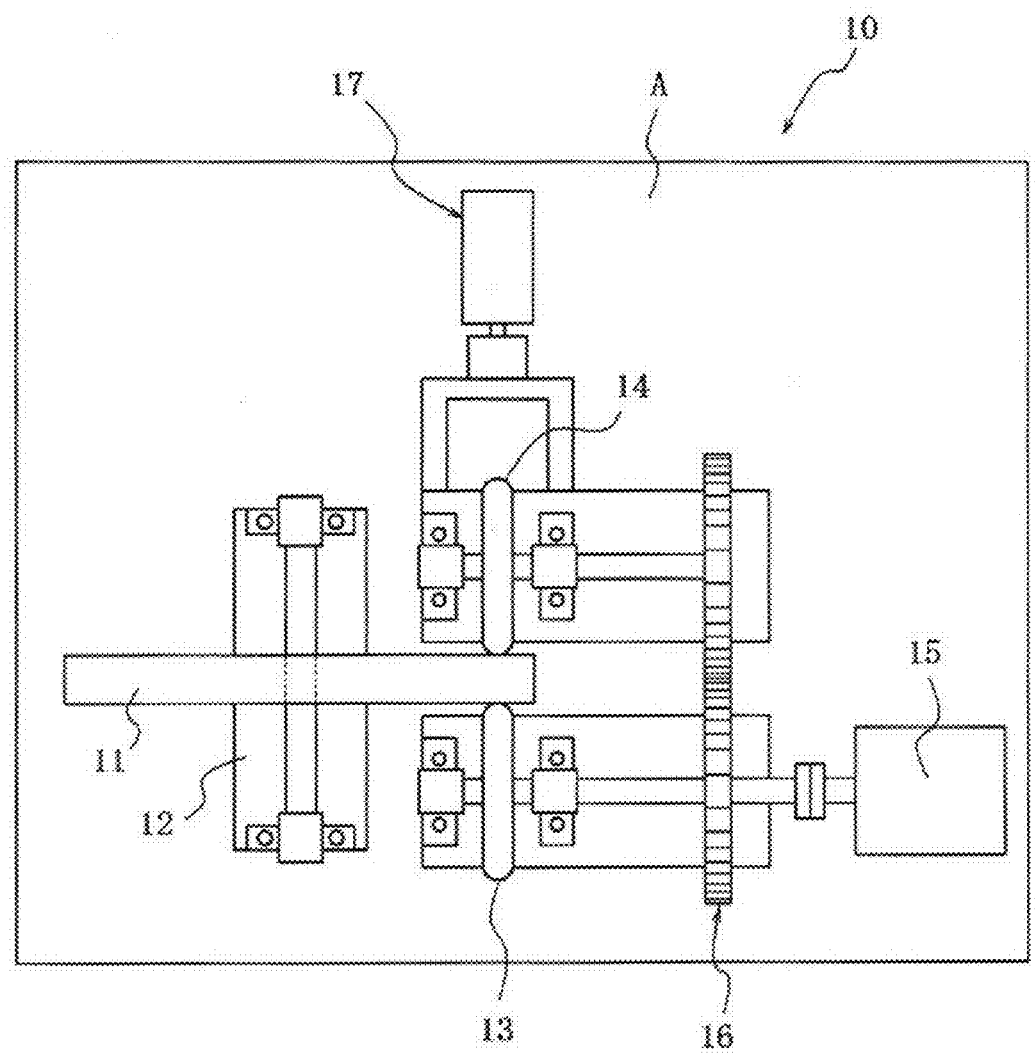
FIG. 2 is a schematic drawing showing a durability life test rig used in a rolling contact fatigue test.
In the drawings, reference numerals denote the following.

A rolling contact fatigue test was conducted using a durability life test rig 10 of a traction transmission part shown in FIG. 2. The durability life test rig shown in FIG. 2 includes a disk 11, a disk support 12 for supporting the disk 11, a first roller 13 to be in rolling contact with one of the sides of the disk 11, a second roller 14 to be in rolling contact with the other side of the disk 11, a drive unit 15 for rotating the first roller 13, a differential rate mechanism 16 giving a peripheral speed difference to the second roller 14 relative to the first roller 13, and a pressure unit 17 for pressing the first roller 13 and the second roller 14 on the disk 11, all of which are disposed on a pedestal A.

In the durability life test rig having the above-described constitution, in the state in which the disk 11 is supported by the disk support 12, and the peripheral side of the disk 11 is held between the first roller 13 and the second roller 14, the disk can be caused to follow the rollers 13 and 14 by the pressure unit 17 to cause rolling contact each of the rollers 13 and 14 and the disk 11. In this case, a peripheral speed difference can be given to the second roller 14 by the differential speed mechanism 16 relative to the first roller 13. Therefore, slipping can be caused between the disk 11 and the second roller 14.

The durability life test can be conducted by reproducing a use state in an actual traction transmission part. In the durability life test rig, the above-described test piece was used for the disk 11, the first roller 13, and the second roller 14. The time taken until failure had occurred due to rolling slide with the roller 14 was measured as a durability life, and the durability of the disk 11 was evaluated on the basis of the durability life.

The test conditions of the durability life test rig 10 were determined as follows:
(1) Roller rotational speed: 3000 rpm
(2) Slip ratio between roller and disk: 14%
(3) Maximum contact surface pressure: 4.2 GPa
(4) Lubricant: traction oil for toroidal continuously variable transmission
(5) Oil film parameter (A): 1.8

The results of the durability life test are shown in Table 2. In Table 1, steel No. 1 is conventional steel corresponding to JIS-SUJ2, and steel Nos. 2, 3, 4, 5, 6, 6, and 8 are comparative steel containing C, Si, Mn, Cr, Mo, Al, and Sb, respectively, at contents out of the range of this disclosure.

In steel part Nos. 2 to 8 (comparative steel) containing essential elements at contents out of the specified range, $B_{50}$ is inferior to steel part No. 1 but is substantially the same value as steel No. 1. In particular, in steel part Nos. 2 and 7 using steels having a low C content and a low Al content, respectively, the microstructure cannot be controlled in the specified range, and the value of $B_{50}$ is excessively decreased. In steel part Nos. 9, 11, 20, and 21 each using steel in which the chemical composition is within the range, but the microstructure differs from the specified structure, $B_{50}$ is superior to steel part No. 1 (conventional steel), but the improvement in $B_{50}$ is only small.

On the other hand, in steel part Nos. 10, 12 to 19, and 21 in which both the chemical composition and the microstructure are within the specified ranges, $B_{50}$ is 10 times or more superior to steel part No. 1 (conventional steel). These test results indicate that a damage pre-venting effect is particularly large in a full-toroidal continuously variable transmission having a large spin component in a contact portion between the roller and the disk and severe contact conditions.

TABLE 1

| Steel No. | Chemical composition of steel (% by mass) | | | | | | | | | | Remarks |
| --- | --- | --- | --- | --- | --- | --- | --- | --- | --- | --- | --- |
| | C | Si | Mn | Cr | Mo | Al | Ni | V | Nb | Sb | |
| 1 | 1.00 | 0.25 | 0.50 | 1.50 | 0.01 | 0.033 | — | — | — | 0.0014 | Conventional steel |
| 2 | 0.65 | 0.98 | 0.59 | 4.22 | 0.44 | 0.033 | — | — | — | 0.0008 | Comparative steel |
| 3 | 0.90 | 0.13 | 0.68 | 2.51 | 0.22 | 0.030 | — | — | — | 0.0009 | " |
| 4 | 1.07 | 1.47 | 0.30 | 2.02 | 0.54 | 0.028 | — | — | — | 0.0008 | " |
| 5 | 0.86 | 1.22 | 0.53 | 1.20 | 0.51 | 0.033 | — | — | — | 0.0009 | " |
| 6 | 0.84 | 1.54 | 0.57 | 4.34 | 0.03 | 0.028 | — | — | — | 0.0010 | " |
| 7 | 0.88 | 1.04 | 0.69 | 2.65 | 0.31 | 0.005 | — | — | — | 0.0011 | " |
| 8 | 1.02 | 1.65 | 0.63 | 2.34 | 0.38 | 0.033 | — | — | — | 0.0038 | " |
| 9 | 1.00 | 1.00 | 0.45 | 3.50 | 0.45 | 0.035 | — | — | — | 0.0010 | Steel of this invention |
| 10 | 1.00 | 1.50 | 0.70 | 5.00 | 0.45 | 0.033 | — | — | — | 0.0011 | " |
| 11 | 0.95 | 1.10 | 1.50 | 2.00 | 0.30 | 0.027 | — | — | — | 0.0009 | " |
| 12 | 0.91 | 1.23 | 0.70 | 4.25 | 0.40 | 0.026 | 1.03 | — | — | 0.0009 | " |
| 13 | 0.90 | 0.91 | 0.70 | 2.55 | 0.50 | 0.033 | — | 0.31 | — | 0.0011 | " |
| 14 | 0.85 | 1.28 | 0.78 | 4.49 | 0.56 | 0.029 | — | — | 0.045 | 0.0009 | " |
| 15 | 1.03 | 0.73 | 0.58 | 3.87 | 0.28 | 0.028 | 0.70 | — | 0.031 | 0.0010 | " |
| 16 | 1.07 | 0.74 | 0.62 | 4.34 | 0.25 | 0.032 | 0.62 | 0.15 | — | 0.0008 | " |

TABLE 2

| Steel part No. | Steel No. | Hot-working (casting) condition | | Spheroidizing annealing condition | | | Surface layer structure after hardening and tempering | | | | B$_{50}$ life ratio | Re- marks |
|---|---|---|---|---|---|---|---|---|---|---|---|---|
| | | Hot-working temp. (°C.) | Cooling rate after hot-working (°C./s) | Retention temp. (°C.) | Retention time (h) | Cooing rate (retention temp. ~700° C.) (°C./s) | Hardening Retention temp. (°C.) | Average residual θ diameter (μm) | Average prior γ grain diameter (μm) | Amount of residual γ (% by mass) | | |
| 1 | 1 | 1000 | 0.4 | 810 | 8 | 0.007 | 900 | 0.47 | 11.1 | 13.1 | 1.0 | *1) |
| 2 | 2 | 1100 | 0.4 | 810 | 8 | 0.007 | 900 | 0.02 | 14.8 | 10.9 | 0.5 | *2) |
| 3 | 3 | 1050 | 0.4 | 810 | 8 | 0.007 | 900 | 0.30 | 11.5 | 12.3 | 0.9 | " |
| 4 | 4 | 1000 | 0.4 | 810 | 8 | 0.007 | 900 | 0.40 | 13.4 | 11.0 | 1.1 | " |
| 5 | 5 | 1050 | 0.4 | 810 | 8 | 0.007 | 900 | 0.34 | 11.0 | 12.6 | 1.0 | " |
| 6 | 6 | 1050 | 0.4 | 810 | 8 | 0.007 | 900 | 0.30 | 13.5 | 12.5 | 1.2 | " |
| 7 | 7 | 1050 | 0.4 | 810 | 8 | 0.007 | 900 | 0.34 | 36.2 | 10.3 | 0.4 | " |
| 8 | 8 | 1000 | 0.4 | 820 | 7 | 0.007 | 900 | 0.30 | 14.4 | 14.0 | 1.3 | " |
| 9 | 9 | 1000 | 1.0 | 780 | 7 | 0.008 | 900 | 0.03 | 19.3 | 30.0 | 2.6 | " |
| 10 | 9 | 1000 | 1.0 | 830 | 7 | 0.006 | 900 | 0.38 | 13.2 | 12.0 | 12.6 | *3) |
| 11 | 9 | 1000 | 1.0 | 830 | 7 | 0.006 | 1000 | 0.06 | 45.0 | 24.0 | 2.3 | *2) |
| 12 | 9 | 1000 | 0.2 | 790 | 7 | 0.006 | 900 | 0.20 | 11.6 | 15.0 | 10.8 | *3) |
| 13 | 10 | 1000 | 0.4 | 810 | 8 | 0.006 | 950 | 0.26 | 16.4 | 12.9 | 14.9 | " |
| 14 | 11 | 1000 | 0.4 | 820 | 7 | 0.007 | 900 | 0.43 | 13.0 | 13.6 | 3.3 | " |
| 15 | 12 | 1050 | 0.3 | 830 | 8 | 0.005 | 950 | 0.25 | 18.3 | 11.6 | 16.4 | " |
| 16 | 13 | 1050 | 0.2 | 780 | 8 | 0.005 | 900 | 0.31 | 12.5 | 11.6 | 9.2 | " |
| 17 | 14 | 1050 | 2.0 | 845 | 7 | 0.003 | 950 | 0.25 | 17.6 | 11.4 | 16.9 | " |
| 18 | 15 | 1000 | 0.4 | 820 | 7 | 0.007 | 900 | 0.40 | 14.9 | 10.5 | 12.8 | " |
| 19 | 16 | 1000 | 2 | 790 | 3 | 0.005 | 900 | 0.03 | 21.0 | 35.0 | 3.3 | *2) |
| 20 | 16 | 1000 | 1.5 | 830 | 8 | 0.052 | 900 | 0.03 | 18.0 | 23.5 | 3.5 | *2) |
| 21 | 16 | 1000 | 1.5 | 830 | 8 | 0.005 | 900 | 0.35 | 13.5 | 11.5 | 14.4 | *3) |

*1) Conventional example
*2) Comparative example
*3) Example of this invention

The invention claimed is:

1. A method for producing a steel part having a long rolling contact fatigue life, comprising:
    hot-working steel,
    spheroidizing annealing the steel by maintaining the steel at about 800° C. to about 850° C. for about 5 hours or more,
    cooling the steel to about 700° C. or less at a rate of about 0.01° C./s or less, and
    hardening and tempering the steel, wherein the steel has a composition comprising:
        C: about 0.7% by mass to about 1.1% by mass;
        Si: about 0.5% by mass to about 2.0% by mass;
        Mn: about 0.4% by mass to about 2.5% by mass;
        Cr: about 1.6% by mass to about 5.0% by mass;
        Mo: about 0.1% by mass to less than about 0.5% by mass;
        Al: about 0.010% by mass to 0.050% by mass;
    less than about 0.0015% by mass of Sb as an impurity, and the balance composed of Fe and inevitable impurities.

2. A method for producing a steel part having a long rolling contact fatigue life, comprising:
    hot-working steel,
    cooling the steel to about 200° C. at a cooling rate of about 0.5° C./s or less,
    spheroidizing annealing the steel by maintaining at about 750° C. to about 850° C.,
    cooling the steel to about 700° C. or less at a rate of about 0.015° C./s or less, and
    hardening and tempering the steel, wherein the steel has a composition comprising:
        C: about 0.7% by mass to about 1.1% by mass;
        Si: about 0.5% by mass to about 2.0% by mass;
        Mn: about 0.4% by mass to about 2.5% by mass;
        Cr: about 1.6% by mass to about 5.0% by mass;
        Mo: about 0.1% by mass to less than about 0.5% by mass;
        Al: about 0.010% by mass to about 0.050% by mass;
    less than about 0.0015% by mass of Sb as an impurity, and the balance composed of Fe and inevitable impurities.

3. The method according to claim 1, wherein the steel further comprises at least one selected from the following:
    Ni: about 0.5% by mass to about 2.0% by mass;
    V: about 0.05% by mass to about 1.00% by mass; and
    Nb: about 0.005% by mass to about 0.50% by mass.

4. The method according to claim 2, wherein the steel further comprises at least one selected from the following:
    Ni: about 0.5% by mass to about 2.0% by mass;
    V: about 0.05% by mass to about 1.00% by mass; and
    Nb: about 0.005% by mass to about 0.50% by mass.

5. The method according to claim 1, wherein cementite grain diameter in the steel in a portion from a depth of about 5 mm to a surface of the steel sheet is about 0.05 μm to about 1.5 μm.

6. The method according to claim 2, wherein cementite grain diameter in the steel in a portion from a depth of about 5 mm to a surface of the steel sheet is about 0.05 μm to about 1.5 μm.

* * * * *